(12) United States Patent
Glinka

(10) Patent No.: US 6,789,761 B2
(45) Date of Patent: Sep. 14, 2004

(54) BELT REEL

(75) Inventor: Oliver Glinka, Ulm (DE)

(73) Assignee: Takata-Petri Ulm (GmbH), Aschaffenburg (DE)

( * ) Notice: Subject to any disclaimer, the term of this patent is extended or adjusted under 35 U.S.C. 154(b) by 0 days.

(21) Appl. No.: 10/101,519

(22) Filed: Mar. 20, 2002

(65) Prior Publication Data

US 2002/0134877 A1 Sep. 26, 2002

(30) Foreign Application Priority Data

Mar. 20, 2001 (DE) .......................................... 101 13 502

(51) Int. Cl.[7] .......................... B60R 22/28; B60R 22/36
(52) U.S. Cl. ..................................... 242/379.1; 242/381
(58) Field of Search ............................. 242/379.1, 381; 247/470; 280/805

(56) References Cited

U.S. PATENT DOCUMENTS

| 3,178,225 | A | | 4/1965 | Bayer ........................... 297/386 |
|---|---|---|---|---|
| 3,881,667 | A | | 5/1975 | Tandetzke ................. 242/107.4 |
| 6,019,392 | A | * | 2/2000 | Karlow ........................ 280/806 |
| 6,102,439 | A | * | 8/2000 | Smithson et al. ............ 280/805 |
| 6,129,385 | A | * | 10/2000 | Blackadder ................. 280/805 |
| 6,183,015 | B1 | * | 2/2001 | Smithson et al. ........... 280/805 |
| 6,481,659 | B1 | * | 11/2002 | Ashtiani et al. .......... 242/379.1 |

FOREIGN PATENT DOCUMENTS

| DE | 2 148 294 A1 | 8/1973 |
|---|---|---|
| DE | 100 34 393 A1 | 1/2002 |
| EP | 1 060 961 A1 | 12/2000 |

* cited by examiner

Primary Examiner—Kathy Matecki
Assistant Examiner—Sang K. Kim
(74) Attorney, Agent, or Firm—Foley & Lardner LLP

(57) ABSTRACT

A belt reel has a spindle having a main body portion and a relatively rotatable end member that can be latched to a fixed frame upon triggering of an activation device. The main body portion of the spindle is formed with a bore which is filled with hydraulic fluid. The spindle further includes a force-limiting element which cooperates with the hydraulic fluid in the bore to produce a resistance against which the spindle body must be rotated when the relatively rotatable end member is latched to the frame.

15 Claims, 4 Drawing Sheets

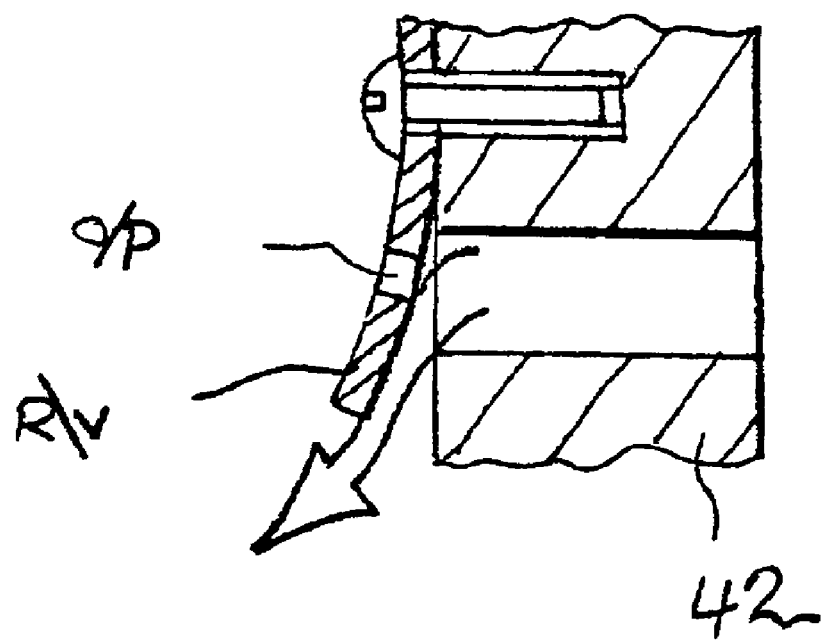

BELT REEL

BACKGROUND

The invention relates generally to a belt reel for safety belts in motor vehicles. More specifically, the invention relates to a belt reel which has a spindle onto which the safety belt is wound and which has a portion which is latched to a fixed frame and prevented from rotating in response to the triggering of an activation device. The reel contains a force limiting element which reduces the force which is applied to the seat belt following the latching operation.

Belt reels that prevent winding out of a safety belt in the event of an accident by a latching a spindle to fixed frame or structure, have been previously proposed.

These belt reels are provided with at least one force-limiting element, which limits the force acting on the person and the safety belt respectively to a given value. The avoids injury to the occupant by the safety belt. The safety belt is wound out from the belt reel while overcoming a resistance produced by the force-limiting element. Energy is dissipated by the force-limiting element.

The force-limiting element in such a belt reel can have one or more components which become mechanically deformed when the pre-determined force is exceeded. Torsion bars are, for example, used as such deformable components and are arranged to twist in the direction of the belt winding out due to a rotational movement of the spindle.

SUMMARY OF THE INVENTION

It is an underlying object of the invention to provide a belt reel which provides increased safety over an increased range of impact speeds.

A belt reel according to the present invention includes force limiting element which takes the form of a hydraulically operating element. When rotation the belt reel is blocked, the wind out length of the safety belt is proportional, on the one hand, to the mass of the person to be secured and, on the other hand, to physical values resulting from the properties of the hydraulically controlled element.

An advantage of such an arrangement is such that the wind out length of the safety belt, in contrast to known force limiting elements, does not depend on the impact speed of the motor vehicle.

The energy at which a person to be secured moves in the event of a rear-end shunt amounts to $E=mv^2/2$ (m: mass of the person; v: impact speed). This energy E results in a force F acting onto the safety belt which is wound out by a wind out length s.

With a force F held constant by a known rotation-resisting element, it follows from $E=Fs$ that the wind out length s is proportional to the square of the impact speed: $s \sim mv^2/2$. This means that the safety belt can continue to wind out at higher impact speeds.

This can be compared with known force-limiting arrangements which can only be arranged to produce suitable control in a certain impact speed range, and wherein the force limitation does not work ideally in the event of impact speeds above and/or below this range.

In contrast, with a hydraulically controlled force-limiting arrangement, the force F, which acts on a displacement body by a fluid flow, is proportional to the square of the flow speed $v_{fl}$ ($F=cApv_{fl}^2/2$ where c: drag coefficient of a displacement body flowing through a fluid; A: cross-section area of the displacement body and p; density of the fluid) so that the energy required for the displacement of the fluid is also proportional to the square of the flow speed. With $E=Fs$, it therefore follows from $scApv_{fl}^2/2=mv^2/2$, under the assumption $v_{fl} \sim v$, that $s \sim m/cAp$. The wind out length s of the safety belt is thus not a function of the impact speed v in a hydraulic force limiter.

A pre-determined wind out length of the safety belt can therefore be set by the adjustment of the hydraulic parameters which is influenced only by the mass of the person to be secured. A belt wind out process, which takes place in a defined and optimum manner at all imaginable impact speeds, thus ensures a constantly good force limitation and thus increased safety.

As a result of the squared dependence of the force F on the flow speed $V_{fl}$ ($F=cApv_{fl}^2/2$) in a hydraulically operating force-limiting element, due to $v_{fl} \sim v$ the force which acts on the safety belt or on the person to be secured is also proportional to the respective speed after the start of the impact delay. The force curve is therefore not constant or even increasing as with known force limiter systems, but degressive (like the speed) and easily adjustable in its curve as in known hydraulic systems. The person to be secured is thereby exposed to a harmonious force development—as with a careful braking, when the force at the brake pedal is slowly reduced.

Advantageous embodiments of the invention are described in the dependent claims, the description and the drawings.

For instance, in a preferred embodiment of the invention, a hydraulic fluid can be displaced by a force in excess of a predetermined value which acts acting on the spindle. Due to this design, hydraulic fluid is used instead of mechanically deformable components for the force limitation, which simplifies the mechanical structure of the belt reel and can result in a substantial weight saving.

It proves advantageous here for the hydraulic fluid to be displaceable by a displacement element either within a fluid container or out of a fluid container. The hydraulic fluid can thus be located in an enclosed container in which it is either circulated by the displacement element or moved from one region of the container into another. Alternatively, it can be forced out of the container through an opening. These methods require, with a suitable selection of the hydraulic fluid, sufficient work to be done that a given amount of energy can be converted into work via the displacement of the hydraulic fluid.

An embodiment is particularly preferred in which the fluid container is divided into two regions and the hydraulic fluid can be displaced from one region into the other. Since the hydraulic fluid cannot leave the fluid container in such an arrangement, there is no need to provide an additional collection container for the displaced hydraulic fluid. A more compact constructional design of the belt reel can thus be realized which in turn, saves space and weight.

The fluid container is advantageously divided into two regions by the displacement element. The displacement element thus has two properties which differ from one another in the displacing and space-dividing effects. The take-over of two functions by one element also provides a weight saving and a simplification of the design.

In a further embodiment of the invention, the displacement of the hydraulic fluid takes place via a restrictor element. The force required for displacement of the hydraulic fluid can be increased by the restrictor element. The restrictor element additionally provides the possibility of precisely setting the force required to displace the hydraulic fluid by the exact design of the restrictor element. An additional parameter for the optimization of the force limitation is herewith provided in addition to the physical properties of the hydraulic fluid.

It is particularly advantageous if the displacement element is simultaneously achieved by the restrictor element. It also performs two tasks in this case. If the displacement element divides the fluid container into the two previously mentioned regions, then it even provides three functions: a restrictor, a space divider and a displacer, whereby a compact and simple design of the belt reel is achieved.

In a further embodiment of the invention, the force limiting element has a means which, after a first activation, returns the element to a state which is substantially similar to a state prior to the activation. The force limiting element is thereby substantially reversible and can, for example, be activated a plurality of times such as in the event of a double impact.

It is possible for the hydraulic fluid to have an electroviscous liquid property. The viscosity and thus the energy absorption in the force limiting element can be set in such a liquid by means of an electric signal. An individual adjustment of the force limiter to the weight of the person to be secured is made possible in this way, for example by means of a seat occupation detection.

It is to be understood that both the foregoing general description and the following detailed description are exemplary and explanatory only, and are not restrictive of the invention as claimed.

BRIEF DESCRIPTION OF THE DRAWINGS

The various features and advantages of the invention will become more clearly appreciated as a detailed description of the preferred embodiments is given with reference to the appended drawings in which:

FIG. 5 is a sectional view of an example of a one-way flow control valve that can be incorporated into the embodiments of the invention.

DESCRIPTION

Figure 1:
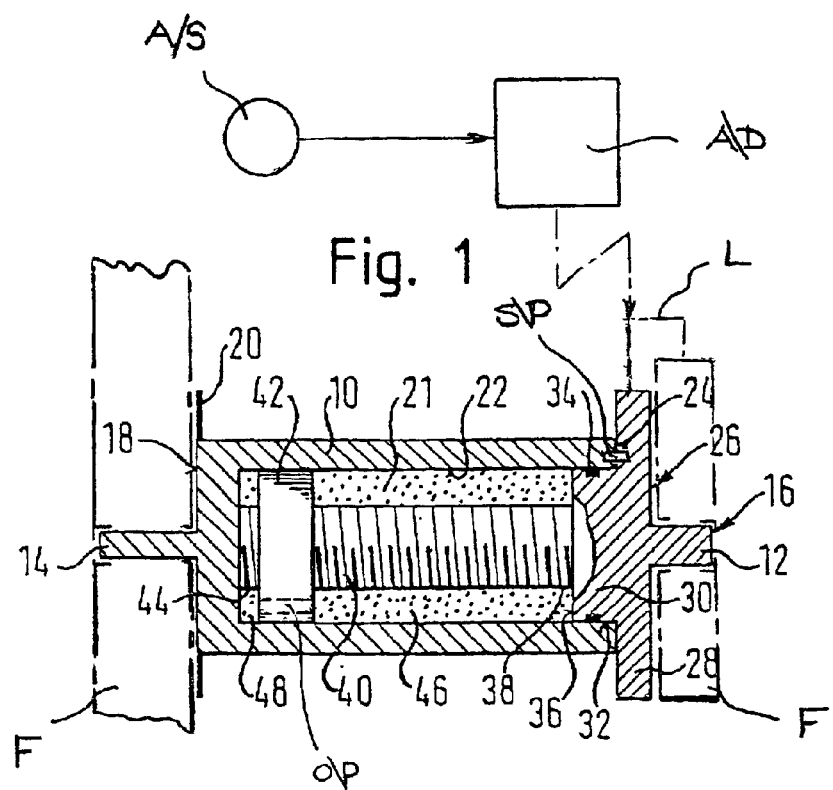
FIG. 1 is a cross-sectional view of an embodiment of a belt reel of the invention.

As shown in FIG. 1, a belt reel for safety belts in motor vehicles is provided. The reel includes a spindle 10 onto which a safety belt (not shown) is wound. This spindle 10 has a spindle shaft 16 having ends 12, 14 which are rotatably supported by a frame F (shown in phantom) that is fixedly connected to and/or forms part of the chassis of a vehicle.

The spindle 10 has a disk-like plate 20 at its first end face 18 for the guiding of the safety belt as it winds onto the spindle.

The spindle 10 is formed with a hollow space or bore 22 which is filled with a hydraulic fluid 21. The bore 22 is open at the second end face 24 of the spindle 10. The cross-section of the bore 22, along essentially all of its length, is non-circular and can be splined or alternatively, have a polygonal profile such as a hexagon. Preferably, only the open end mouth portion of the bore 22 is circular.

The bore 22 is closed by a cap member 26. The cap member 26 has a flange 28 and a closure portion 30 which is disposed in the mouth of the bore 22. The cross-section of the closure portion 30 is matched to the cross-section of the bore, which is circular at its open end. Relative rotation between the spindle 10 and the cap 26 is permitted. The closure portion 30 may be provided with a sealing ring 34 such as O-ring or the like, to provide a hermetic seal and prevent leakage of the hydraulic fluid 21.

The flange 28 is adapted to be latched with respect to the frame in the event of a response of the acceleration sensor in the event of an accident. A latch L may be provided for this purposed. This flange 28 cooperates with disc plate 20 to ensure a proper winding of a safety belt.

A threaded shaft 40 is disposed coaxially within the bore 22. A first end 38 of this shaft is rigid with the cap member 26 while the other end 44 is arranged to terminate immediately proximate the blind end of the bore 22.

A nut 42 is threadedly received on the threaded shaft 40. The nut 42 is shaped to either match the cross-section or to cooperate with the shape of the bore in a manner wherein rotation of nut 42 within the bore is prevented. Under normal operation of the belt reel, the nut 42 is located proximate the end region 44 of the threaded shaft 40.

The nut 42 can be screwed along the threaded shaft 40 toward its first end 38 of the threaded shaft 40 by rotation of the spindle 10 about the shaft 40 when the flange 28 is latched or blocked.

The nut 42 divides the bore 22 into two regions or variable volume chambers 46, 48. The nut 42 is furthermore provided with at least one hole or opening which defines an orifice passage O/P through which the hydraulic fluid 21 can flow from region 46 to region 48 when the nut 42 is forced to move axially along the shaft 40. The openings are matched in their dimension and number to the viscosity of the hydraulic fluid 21 and thus act as restrictors which restrict the transfer of the hydraulic fluid 21 therethrough.

This restrictor effect provides a high resistance to the axial movement of the nut 42, and thus also resists rotational movement of the spindle 10 and winding out of the safety belt. This resistance must be overcome to enable the safety belt to wind off the spindle 10 when the flange 26 latched and prevented from rotating.

Only a force of sufficient magnitude acting on the safety belt and overcoming this resistance results in a winding out of the safety belt. The work done in pumping the hydraulic fluid through the orifice passages dissipates superfluous energy and dampens the impact effect on the occupant restrained by the seat belt.

Viscous liquids are used as the hydraulic fluid 21. The viscosity and density of the hydraulic fluid 21 are selected with respect to the dimension of the orifice passages in the nut 42. It is possible to use an electro-viscous liquid whose viscosity can be adjusted by means of an electric signal (i.e. an electrorheopectic fluid which increases in viscosity in response to a electromagnetic field).

The function of the belt reel shown in FIG. 1 is such that, in the event of an accident of sufficient intensity, an acceleration sensor A/S produces a signal which induces an activation device A/D to latch the flange 26 to the frame. However, as long as the force acting on the safety belt does not exceed a predetermined value, because, for example, the impact speed or the mass of the person secured by the seat belt is not sufficiently large, the spindle 10 is secured to the flange 26 and thus the frame F by a shear pin S/P or alternatively a rotation inhibiting spring (not shown). Under these conditions, relative rotation between the spindle 10 and the threaded shaft 40 does not occur and the nut 42 does not move.

Only in the event of larger forces such as occur with heavier persons or higher impact speeds, is the force acting on the safety belt sufficient overcome the response threshold produced by the shear pin S/P or the rotation inhibiting spring. Once this threshold is exceeded, the spindle 10 rotates with respect to the latched flange 26. Accordingly, the nut 42 is rotated and screwed in the direction of cap member 26. The hydraulic fluid 21 is displaced by the nut 42 and pumped through the orifice passage or passages O/P from the region 46 into the region 48.

During this rotation of the spindle 10, the safety belt can wind out by a certain length s under the effect of a force F, with F corresponding to the force F which a body (nut 42) of cross-section A and drag coefficient c produced by the turbulent flow of liquid (hydraulic fluid 21) with a density p at a speed $v_{fl}$.

An energy $E=cApv_{fl}^2s_{fl}/2$ is required to move the nut 42 against the liquid flow by a distance $s_{fl}$. If this is set equal to the energy $E=mv^2/2$, wherein the person to be secured having a mass m, moves against the safety belt in a rear-end shunt with an impact speed v, then it results, under the assumption $v_{fl}\sim v$, that $s\sim m/cAp$.

Given the analog assumption that the length s, by which the safety belt winds out, is proportional to $s_{fl}$, it therefore results that the wind out length s is merely a function of the mass of the person to be secured and the intrinsic properties of the hydraulic force limiter. A dependence of the wind out length on the impact speed does not occur with hydraulically operating force limiting element, which provides increased security for the person to be secured.

Figure 2:
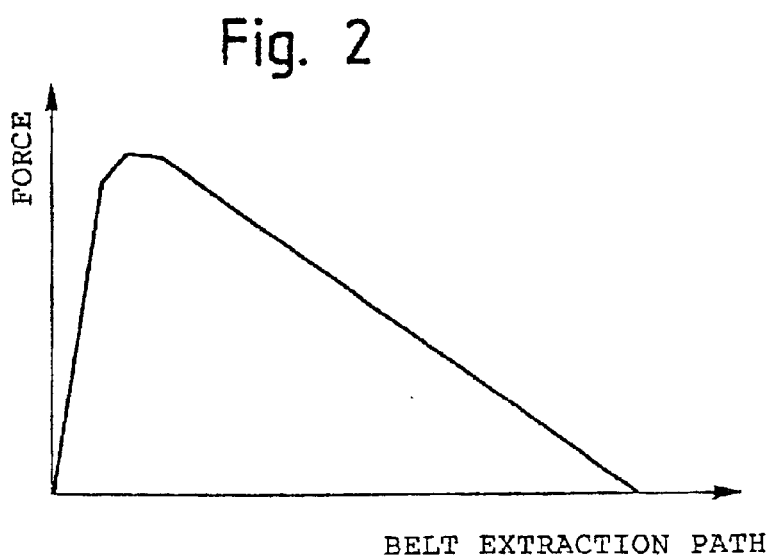
FIG. 2 is a schematic force curve achievable with the belt reel in FIG. 1 as a function of the belt extraction path.

It follows from the energy used $E=cApv_{fl}^2S_{fl}/2$ that $F=E/s=cAp\ v_{fl}^2/2$. This means, under the assumption $v_{fl}\sim v$, that the force F acting on the person to be secured by the safety belt is proportional to the square of the impact speed v and thus to the square of the belt wind out speed (FIG. 2). The force F therefore, like the speed, follows a degressive characteristic which is furthermore easy to set.

Figure 3:
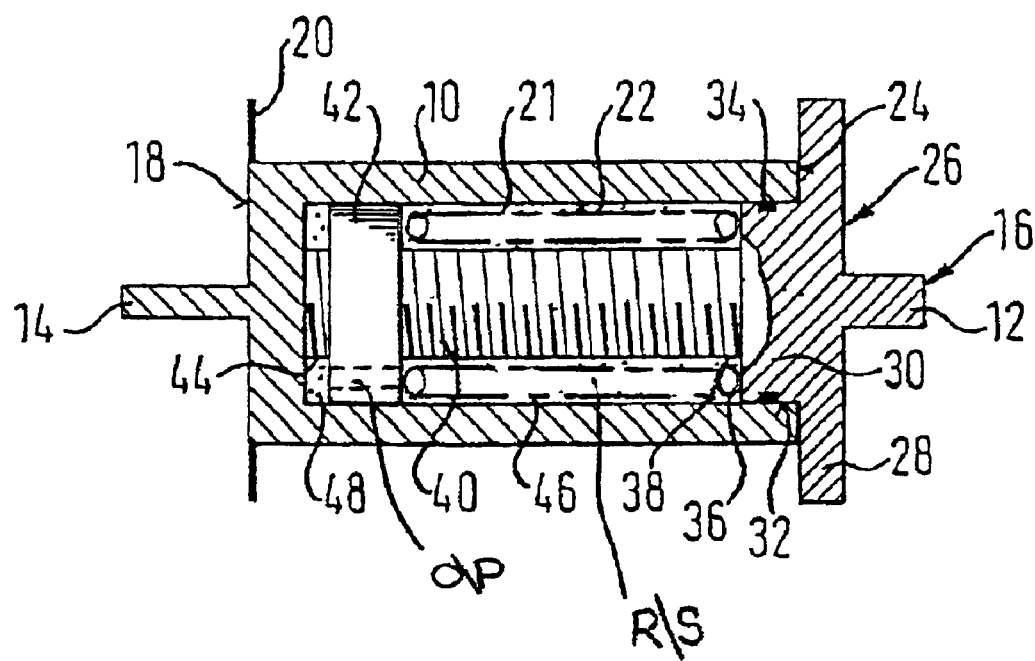
FIG. 3 is a cross-sectional view of an embodiment of the invention which is provided with a return spring for returning the resistance generating element to its original position after a resistance generating operation.

FIG. 3 shows an embodiment of the invention wherein a return spring R/S is interposed between the nut 42 and the cap member 26 in a manner which induces the nut to return to its original position after a force limiting operation has occurred.

Figure 4:
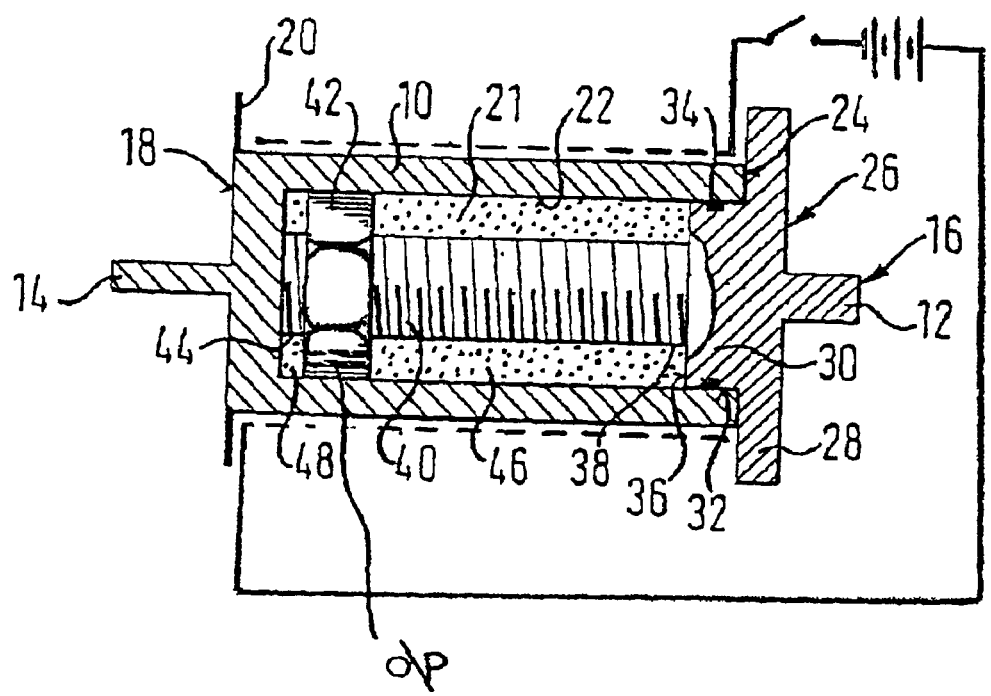
FIG. 4 is a schematic depiction of an electrode arrangement which can be used to control the viscosity of an electrorheopectic fluid or the like which is used as a working fluid.

FIG. 4 shows another embodiment wherein electrodes are disposed proximate the spindle so as to enable the formation of an electromagnetic field which will induce an increase in viscosity in an electrorheopectic fluid in the bore 22. The resistance to the axial movement of the nut 42 and the rotation movement of the spindle 10 may be accordingly controlled by the application of an electric signal.

FIG. 5 shows one example of a one-way flow control arrangement which can be used to restrict flow of hydraulic fluid in one direction only. In this instance, the valve is illustrated as being a simple reed valve R/V which is formed with a bore which defines the orifice passage O/P though which the hydraulic fluid must be forced when the valve is closed. In FIG. 5 the valve is illustrated as being open allowing hydraulic fluid to pass freely through a bore of relatively large diameter formed through the nut 42.

Of course, the arrangements shown in FIGS. 3–5 are merely illustrative of the type of arrangements which can be used in connection with the embodiments of the present invention in order to achieve the required operational characteristics.

The priority document, DE 101 13 502.5, filed Mar. 20, 2001 is incorporated by reference herein in its entirety.

While the invention has been described with reference to only a limited number of embodiments, it will be understood that various modifications and changes can be made without departing from the scope of the invention which is limited only by the appended claims. For example, it is within the scope of the present invention to incorporate a positive displacement type gear pump arrangement into the spindle and to throttle the output of the pump in a manner which provides the required resistance to spindle rotation.

What is claimed is:

1. A belt reel for safety belts in motor vehicles comprising:
    a spindle for winding up a safety belt and which has a portion that is adapted to be latched to a fixed frame upon the triggering of an activation device, and
    hydraulically controlled force limiting element which is operatively interposed between the spindle and the frame;
    wherein the spindle includes a bore containing hydraulic fluid, the bore being closed by a flange member which can be selectively latched to the fixed frame by a triggering of the activation device, and wherein the flange member is rotatable relative to the spindle;
    wherein the hydraulic fluid is displaced into or out of the container by a displacement element when a force in excess of a predetermined value is applied to the spindle; and
    wherein the flange member comprises a threaded shaft that extends through the bore.

2. The belt reel of claim 1, wherein the bore has a first region and a second region; and the hydraulic fluid can be displaced from a first region into a second region.

3. The belt reel of claim 1, wherein the bore is divided into two regions by the displacement element.

4. The belt reel of claim 1, further comprising a restrictor element for displacing the hydraulic fluid.

5. The belt reel of claim 1, wherein the displacement element is a restrictor element.

6. The belt reel of claim 1, wherein the displacement element is connected to the spindle for rotation therewith.

7. The belt reel of claim 1, wherein the displacement element comprises a nut which is screwed onto the threaded shaft and which is connected with the spindle so as to be simultaneously rotatable therewith.

8. The belt reel of claim 7, further comprising a spring positioned between the nut and the flange member for returning the nut to its position prior to activation.

9. The belt reel of claim 7, wherein the connection between the nut and the spindle comprises a splined profiles the bore and on the nut, respectively.

10. The belt reel of claim 7 wherein the nut divides the bore into first and second chambers.

11. The belt reel of claim 10, wherein the restrictor element comprises at least one opening in the nut through which hydraulic fluid can be displaced from the first chamber to the second chamber.

12. The belt reel of claim 10, wherein the nut has a valve which allows a low resistance return flow of the hydraulic fluid from the second chamber into the first chamber.

13. The belt reel of claim 1, further comprising a return mechanism for returning the force limiting element to a state which is substantially similar to a state prior to activation whereby the force limiting element may be activated a plurality of times.

14. The belt reel of claim 13, wherein the return mechanism comprises a spring interposed between the spindle and the frame.

15. The belt reel of claim 1, wherein the hydraulic fluid is an electro-viscous liquid adapted to have an electrically controlled viscosity.

* * * * *